March 5, 1929.  J. R. GAMMETER  1,704,186
METHOD FOR MAKING TIRE BUILDING BANDS
Filed April 16, 1925  2 Sheets-Sheet 1
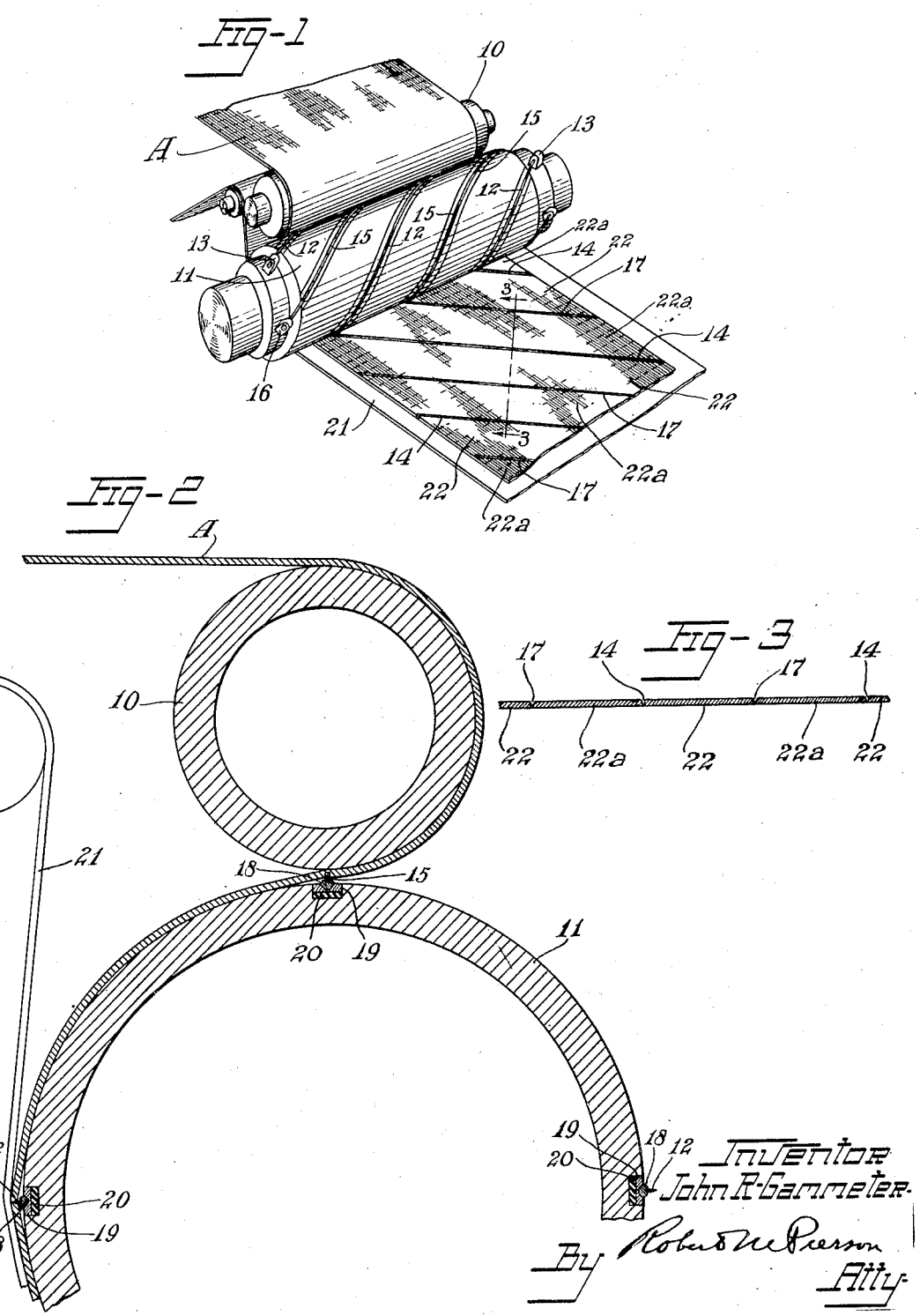
Inventor
John R. Gammeter
By Robert McPierson
Atty.

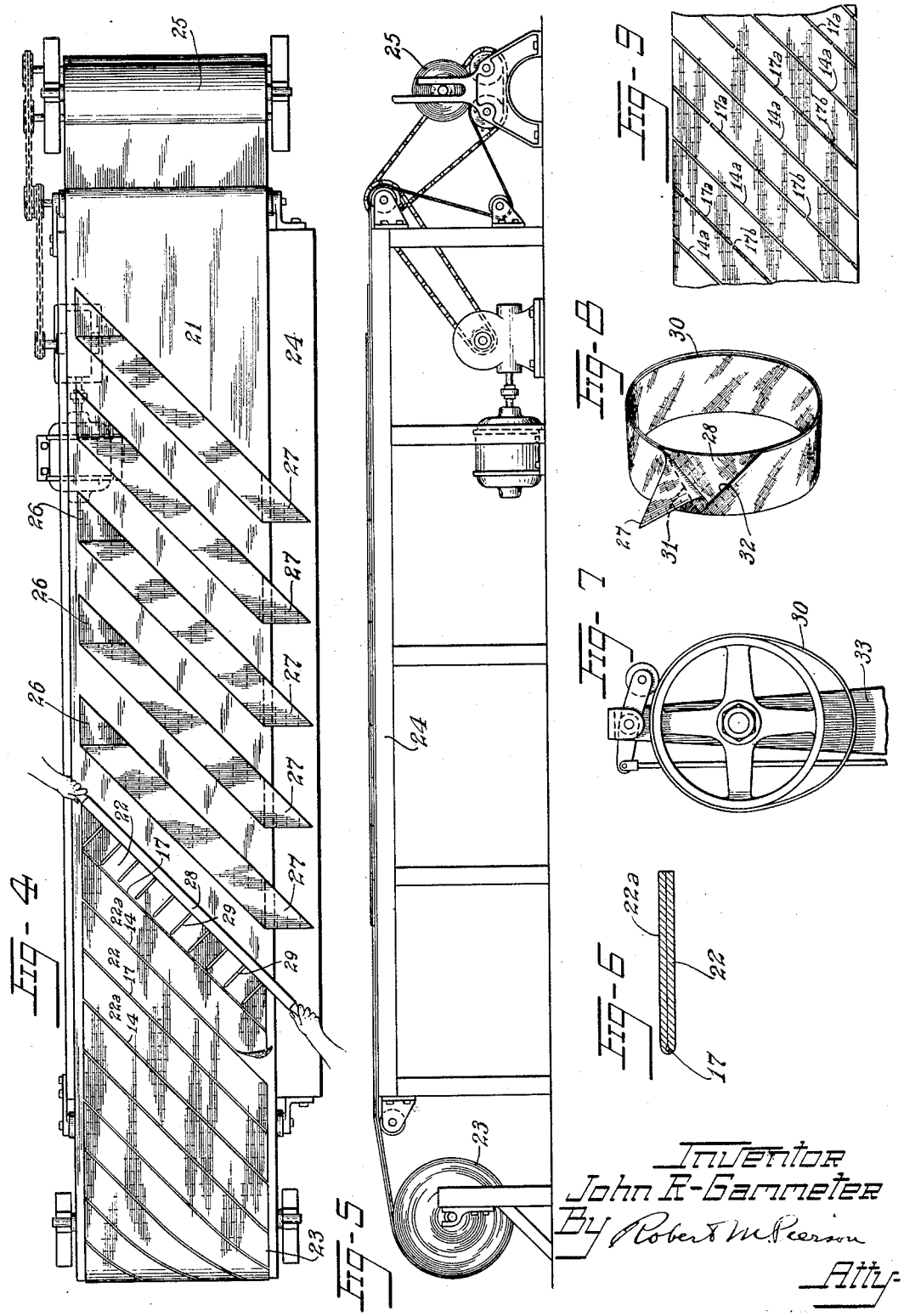

Patented Mar. 5, 1929.

1,704,186

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD FOR MAKING TIRE-BUILDING BANDS.

Application filed April 16, 1925. Serial No. 23,707.

This invention relates to methods and apparatus for making laminated strips or bands and is especially applicable to the preparations of two-ply, endless, rubberized fabric bands suitable for use in the building of cord tires.

My chief object is to provide improved procedure and apparatus whereby such laminated bands may be readily and economically produced with their laminations in perfect registry. Further objects are to provide a laminated length of material such as rubberized fabric adapted to be handled without distortion and to have its ends readily and securely joined together to form an annular band.

In attaining these objects I bias-cut a web of fabric or the like into obliquely disposed strips, and score or partially cut each strip along a line running lengthwise thereof, fold the strip on such line to form a laminated strip of which the plies are perfectly registered at the line of fold, and join the ends of the laminated strip, this procedure providing a strip having one of its plies extending beyond the other at each end in such form as to permit the ends of the laminated strip so to interfit with each other as to provide a two-ply structure throughout the region of the splice and to cause the seam of each ply to be disposed at an angle to the seam of the other ply, so that there is a mismatched, strength-providing effect at the splice.

Of the accompanying drawings:

Fig. 1 is a perspective, diagrammatic view of parts of a rotary bias cutter embodying and adapted to carry out my invention in its preferred form, and the work therein.

Fig. 2 is a vertical cross-section of the same.

Fig. 3 is a section of the work on line 3—3 of Fig. 1.

Fig. 4 is a plan view of apparatus adapted to carry out a later step of the method, with the work in place.

Fig. 5 is a side elevation of the same.

Fig. 6 is a cross-section of one of the laminated strips.

Fig. 7 is an elevation of parts of a band-splicing device and a band thereon.

Fig. 8 is a perspective view of an endless band made in accordance with my invention, a part of the outer ply being turned back for clearness of illustration.

Fig. 9 is a plan view of a web of fabric bias-cut in accordance with a modification of my invention.

Referring to the drawings, a web of rubberized fabric A, for example, which may be weak-wefted fabric, as shown, or may be weftless or square-woven fabric, is bias-cut by passing it between a platen roll 10 and a cutter roll 11. The cutter roll has spaced apart, flexible knives 12, 12 helically wound upon its surface and held under tension thereon by end anchorages 13, 13 secured to the roll, said knives being adapted completely to sever the fabric against the platen roll 10, as at 14, 14, and alternating with and spaced from said knives, circumferentially of the roll, are relatively dull knives or scorers 15, 15 similarly mounted and held tensioned by end anchorages one of which is shown at 16, the said scorers being adapted to score or weaken the fabric as at 17, 17, by their action against the platen roll 10, without completely severing it.

The knives 12 and the scorers 15 are preferably supported radially of the roll by hard but flexible base members 18, 18, 19, 19, wound in helical grooves formed in the face of the drum, cushion strips of rubber 20, 20 being mounted in said grooves under the base members 19 to provide a yielding pressure of the knives and scorers against the platen roll 10, as is clearly shown in Fig. 2.

A liner 21 is passed partly around the cutter roll, against the work carried thereby, and is caused to receive and transport from the cutter in orderly relation the bias-cut strips, each comprising a zone 22 on one side, and a zone 22ᵃ on the other side, of the score line 17.

The liner and the bias cut strips thereon, as they come from the bias cutter, may be reeled into a stock roll, such as is shown at 23 in Figs. 4 and 5, for storage or transportation, but such reeling is immaterial to my invention, since the subsequent steps might be performed without it. When the liner and strips are so reeled, the stock roll 23 is subsequently mounted for rotation adjacent one end of a table 24 (Figs. 4 and 5) and the liner 21, with the bias-cut strips thereon, is drawn over the table to bring the strips in position to be folded thereon and removed, and the liner is rewound into a roll 25 at the other end of the table.

With the bias-cut strips supported upon the table 24, each is folded upon itself, upon the scored line 17, so that the zone 22ᵃ overlies the zone 22 as shown in Fig. 6, and, when the score line is at the middle of the strip, as in the preferred practice here shown, the two plies are coextensive laterally of the folded strip but one extends beyond the other at each end of the folded strip, in a triangular zone 26 or 27, as is shown clearly in Fig. 4. The accurate folding of the strip may be facilitated by the use of a comb-like instrument such as is shown in Fig. 4, said instrument comprising a back or bar 28 and spaced apart teeth 29, 29 projecting therefrom and adapted to be held with their points pressing upon the zone 22 of the strip adjacent the score line 17. With the instrument so held the zone 22ᵃ of the strip is folded over thereonto, the scoring of the strip resulting in an accurate line of fold, the instrument is then slipped from between the plies, which are thereby permitted to come into contact with each other progressively from the line of fold toward the margins of the strip, avoiding wrinkles or buckles, and the zones or plies 22 and 22ᵃ are then pressed adhesively together.

After each strip is thus folded upon itself it is taken from the liner 21 and its ends are adhesively joined to form an endless band 30, Figs. 7 and 8, the projecting zones 27 and 28 of the respective plies being overlapped upon and adhesively pressed against each other, which provides a strong splice, the seam 31 of one ply being mismatched with the seam 32 of the other ply (Fig. 8). The ply seams may be either lap or butt seams, as by the use of either type of seam the adhesion of the plies to each other throughout the zones 27, 28 affords a strong connection.

The joining of the ends of the folded strip may be facilitated and the resulting endless band may be conveniently pressed to improve the adhesion of its plies by the employment of a band-building device such as is shown at 33 in Fig. 7 and of which the mode of operation will be obvious.

In the modified type of bias-cut fabric web shown in Fig. 9 the web is completely severed at 14ᵃ, 14ᵃ, and at the folding lines, 17ᵃ, 17ᵃ through incisions are made but short unsevered zones or bridges 17ᵇ, 17ᵇ are left between such incisions, so that the two zones of the strip are lightly held together by said bridges but the strip is so weakened along the line of the incisions as to facilitate the accurate folding of the strip on said line, the procedure being in other respects the same as that above described.

For producing strips as shown in Fig. 9 the scorers 15 of Fig. 2 are replaced by sharp knives such as the knives 12 of Fig. 2, except that their cutting edges are notched at intervals in a manner such as to provide the uncut zones 17ᵇ.

Further modifications may be resorted to without departing from the scope of my invention, and I do not wholly limit my claims to the exact procedure or the specific construction described.

I claim:

1. The method of making bands of rubberized fabric which comprises cutting a bias strip from a web of the said fabric, weakening said strip along a line running longitudinally thereof, folding said strip upon itself, along the said line, and adhesively pressing together the zones of said strip thus presented to each other.

2. A method as defined in claim 1 in which the zones are caused to contact each other progressively from the line of fold toward the margins of the strip.

In witness whereof I have hereunto set my hand this 11th day of April, 1925.

JOHN R. GAMMETER.